United States Patent [19]
Tooka

[11] 3,805,244
[45] Apr. 16, 1974

[54] COMPUTER PROCESS-CONTROL SYSTEM FOR CARRYING OUT SPINNING OPERATION

[75] Inventor: Takuzo Tooka, Aichi-ken, Japan

[73] Assignee: Kabushiki Kaisha Toyoda Jidoshokki Seisakusho, Kariya-shi, Japan

[22] Filed: May 25, 1971

[21] Appl. No.: 146,659

[30] Foreign Application Priority Data
May 26, 1970   Japan................................. 45-44703
May 26, 1970   Japan................................. 45-44704
May 26, 1970   Japan................................. 45-44705
May 26, 1970   Japan................................. 45-44706

[52] U.S. Cl................ 340/172.5, 235/151.1, 318/6, 444/1
[51] Int. Cl....................... B65h 59/38, G06f 15/46
[58] Field of Search.......... 444/1; 235/151.1; 318/6, 318/7; 242/75.44

[56] References Cited
UNITED STATES PATENTS
3,248,621   4/1966   Carter et al............................ 318/6
3,694,636   9/1972   Smith, Jr................................ 235/151.1

OTHER PUBLICATIONS
Gorenstein, S., "Fabrication and Assembly Operations," IBM Systems Journal, Vol. 4, Issue 3, 1965, pp. 241–249.

Shapiro, S., "Fabrication and Assembly Operations," IBM Systems Journal, Vol. 4., Issue 3, 1965, pp. 250–255.

Primary Examiner—Raulfe B. Zache
Attorney, Agent, or Firm—Maleson, Kimmelman & Ratner

[57] ABSTRACT

A computer process-control system for carrying out a spinning operation where optimum parameters are computed by a computer in accordance with a desired accumulative production amount. The spinning operation is carried out in accordance with the parameters and actual data generated in each process is applied to the control computer. The control computer compares the difference between the actual accumulative amount of production with a desired one. When the difference between actual amounts of production and a desired amount of production falls outside of an allowable range, the parameters as well as the driving condition of the process are automatically revised by the control computer.

2 Claims, 10 Drawing Figures

PULSE DIAGRAM IN THE OPEN-END SPINNING PROCESS

DIAGRAM SHOWING TRANSPORTATION SEQUENCE OF FULL PACKAGED CANS

Fig. 8C

DIAGRAM SHOWING THE CONDITION OF TAKER-IN MECHANISM

CONDITION OF TAKER-IN MECHANISM / CANS FROM GROUP UP FRAME

| | | 1 | 2 | X-1 | 3 | ----- | X | X-1 |
|---|---|---|---|---|---|---|---|---|
| No.1 | R | × ○ | ○ ○ | ○ ○ | ○ ○ | | ○ ○ | ○ ○ |
|  | L | × | ○ ○ | ○ ○ | ○ ○ | | ○ ○ | ○ ○ |
| No.2 | R | | × ○ | ○ ○ | ○ ○ | | | |
|  | L | | × | ○ ○ | ○ ○ | | | |
| No.3 | R | | | ○ ○ | × ○ | | | |
|  | L | | | ○ ○ | × | | | |
| ⋮ | | | | ○ ○ | | | | |
| No.X-1 | R | | | × ○ | | | | |
|  | L | | | × | | | | |
| No. X | R | | | | | | × ○ | |
|  | L | | | | | | × | |
| No.X+1 | R | | | | | | | × ○ |
|  | L | | | | | | | × |

NOTE: (X) DESIGNATES "WORKING"
(O) DESIGNATES "RESTING"

COMPUTER PROCESS-CONTROL SYSTEM FOR CARRYING OUT SPINNING OPERATION

BRIEF SUMMARY OF THE INVENTION

The present invention relates to a central control system for carrying out spinning operation, more particularly, relates to a digital computer process-control system for carrying out spinning operation.

The most significant and fundamental developments of the technical revolution in the spinning industry, which have been produced in the last 10 or 15 years, are "a continuous process which comprises an opening machine and carding machines and a drawing frame connected in order," "continuous automatic spinning system such as Toyobo or Toyoda or Rieter system", and "so-called open-end spinning frame." However, it has been realized that a highly skilled operator is required to carry out the spinning operation utilizing one of the above-mentioned modernized systems, because, high level engineering knowledge is essential to operate the above-mentioned systems without troubles. Further, the labor problem of obtaining highly skilled operators is becoming increasingly difficult in the developed countries.

According to rapid changes of fashion in developing countries, various demands on textile products are made, particularly in the field of worsted yarn or synthetic yarn, consequently, small scale production of various kinds of yarn has always been done in the worsted or synthetic yarn spinning mills. Furthermore, it is difficult to simplify the production programs for manufacturing the above-mentioned various kind of yarns in those types of mills therefore the operation efficiency of the spinning machine is restricted by low level.

The principle object of the present invention is to provide a unique central control system for carrying out the spinning operation by utilizing a computer process-control system, which comprises setting an initial process schedule or programing of the operation in accordance with a given schedule of production, programing the operation of each component process and programing workings of auxiliary devices, comparing measured production data with the above-mentioned program and reprograming the operation of each component process for correcting the operating-conditions so that the operation of each equipment is carried out under the corrected program, whereby the production in each process before the last spinning process is subjected to a balance with the consumption of roving or sliver in the spinning process, in other words, the relation between the production in the upstream process and the consumption in the successive downstream process is always maintained within an allowable range dictated by the basic production program of the spinning process so that very stable operation of every equipment can be carried out.

Another object of the present invention is to provide au automatic control system for properly operating auxiliary devices such as an automatic yarn piecing machine, automatic doffing machine, and automatic transferring equipment for carrying bobbins or cans by utilizing computer-control system connected with the above-mentioned central control system.

A further object of the present invention is to provide an automatic central control system for tightly managing whole activities of a manufacturing company wherein a computer is installed in a central management office, where production activity in connection with sales and storage activity is managed and is connected to the control computer, mentioned above, by means of an on-line system.

THe computer-process system for carrying out spinning operation according to the present invention can be satisfactorily applied to various modern spinning mills wherein the above-mentioned continuous process of opening-carding-drawing machines or continuous automatic spinning system or open-end spinning frame is used. Further, if the problem in connection with the depreciation of equipments can be solved, the control system of the present invention can be applied to the traditional cotton, worsted or synthetic yarn spinning systems.

However, in all of these various spinning systems, a common principle for managing the processes can be identified and the computer-control system according to the present invention can be illustrated by an embodiment in a spinning process utilizing the continuous process of opening-carding-drawing system and the open-end spinning frame.

In the computer-control system of the present invention, the monthly (or weekly) demand of production is scheduled for every variety of yarn by the production department, in accordance with the sales schedule, storage data and market demand. The basic data, such as number of equipments, productivity of each equipment, standard operation speed of equipment etc., and machine words (software, for example Fortran words) are stored in the central computer in the management center. Then the monthly (or weekly) demand of production is used as an input to the computer. A simulation is then carried out to determine an optimum schedule for producing the monthly demand under stable conditions. Thus, the fundamental production schedual (hereinafter referred to as initial program) can be set in the computer.

In the case of big spinning companies having many branch offices, it is effective to establish with the central computer system a so-called "data communication system" which connects the central large computer installed in the central computer system with a plurality of small control computers which are installed in a plurality of spinning mills, whereby each small control computer receives input data in accordance with the above-mentioned program.

In the automatic control system of the spinning process according to the present invention, the controlled processes relate to "accumulative production which can be adjusted by changing delivery speed of the equipment," "flow route of semiprocessed ggods between the two successive processes which is changed in accordance with changing the count of yarn." Auxiliary works such as "transportation of product or semiprocessed product," "automatic doffing operation," "changing the supply of semiprocessed product of the upstream process to the successive process" are automatically controlled in accordance with an output of the control computer so that the actual accumulative production of the processes is compared with the respective initial programs so as to maintain the accumulative production within the allowable ranges. If an automatic piecing machine is utilized in the spinning, process, an operation cycle of this machine is set in the initial program.

The control computer sends various instructions for controlling the controlled processes so as to carry out the production in accordance with the initial program while necessary input data are fed into the computer from the controlled processes so that the inputs are compared with those of the initial program and when non-allowable differences between them are detected, the output signals for regulating the controlled processes are generated. In any particular case where the accumulative production in the last spinning process reaches an undesirable condition, in other words, it is detected that the above-mentioned difference in connection with the accumulative production in the last spinning process falls outside the allowable range, firstly, an additional programing is carried out to find a revised program by which the final accumulative production can be attained by means of changing the delivery speed of yarn. In the above-mentioned programing, the following condition is also computated. That is, whether the upstream processes should be carried out under their revised programs or not. If the semiproduction product such as sliver or roving are sufficiently in reserve to supply the downstream processes, it is not necessary to revise their initial program, and vice versa. In the former case, it is only necessary to change the schedule for supplying sliver cans or roving bobbins to the spinning frames. And after the accumulative production in the last spinning process reaches the allowable range of the initial program, the spinning condition is reverted to that of initial program. The above-mentioned control schedule is computed by the control computer and is carried out in accordance with the output of the control computer. In the latter case, the revised programs of the upstream processes are also reverted to their initial programs after the accumulation production in the last spinning process reaches the allowable range of the initial program by the action of the control computer.

If it is computed that the changing capacity of the last spinning process in connection with the accumulation production is insufficient to recover, the data, showing the degree of inadequacy of the capacity of the last spinning process, is transferred to the central computer installed in the central computer system by the on-line communication system, so that reprograming of the production schedule can be carried out. Thereafter, if it is required to change the production schedules in the mills, the revised program is transferred to the control computers. As mentioned above, it is one of features of the present invention that the computer process-control of the spinning process is carried out on the basis of the accumulative production in the component processes, particularly in the last spinning process.

As already mentioned, in the computer control system according to the present invention, it is essential to maintain the balance between the production of the semiproduction product in the upstream process and the consumption of the above-mentioned product in the successive downstream process. Otherwise, it is impossible to carry out the spinning operation in the preferred stable condition. One can not prevent stopping of the driving of the spinning machines due to the winding of fibers about the draft rollers or other troubles and in our experience, the above-mentioned troubles sometimes occur. Consequently, it is required to reserve a fair number of packages of the semiproduction products between the successive separate two processes, so as to ensure the stable spinning operation. In the computer process system according to the present invention, an initial program for reserving the semiproduction products is set when the simulation is carried out by the control computer, and in the mill processing, the control computer computes whether the estimated number of packages for reservation, or actual number of packages reserved, exceeds or is below the allowable range and the production speed of the process is automatically adjusted in accordance with the output of the control computer. And when the control computer computes that the required balance condition between the above-mentioned production and consumption is satisfied within the allowable range, the production speed of the process is automatically returned to its initial condition in accordance with the output of the control computer. In a particular case, for example, in the case of stopping the downstream process, the upstream process may be stopped in accordance with the reserve program. Therefore, the above-mentioned automatic control system in connection with the reserve program is also one of features of the present invention. A further feature of the present invention is an automatic transportation system of semiproduction product which is controlled by the control computer. In the present invention, the semiproduction product of the upstream process, for example, full packaged cans or full packaged bobbins, is transferred to the downstream process in accordance with a transportation program computed by the control computer at the time of simulation. However, in the actual processing, it is necessary to avoid interference between the packages in the transportation route. The control computer functions to control the traffic of the transport apparatus. If an unallowable situation in the relation between the production and consumption in the two successive separate processes is computed by the control computer, a revised program of transportation is computed by the computer so that the transportation of the semiproduction products of the upstream process are supplied to the downstream process in accordance with the revised program. From our mill tests, in the above-mentioned revision of the transportation program, the order only of supply to the machines is changed in most cases. When the control computer computes that the above-mentioned unbalanced condition has recovered, the transportation of the semiproduction product is carried out in accordance with the initial program.

A further feature of the present invention is an automatic control system for actuating various auxiliary works such as the automatic yarn piecing operation, the automatic doffing operation etc. in accordance with their own cycle set in the computer-process system. As already illustrated, the computer process system of the present invention has various noteworthy features. And it is possible to install a control desk in the central system by which the instantaneous condition of production, sales or storage condition etc. can be visibly read, so that very complete management control can be carried out.

Generally, different types of spinning equipments are installed in various spinning mills. However, in identical spinning mills producing the same type of yarn, the fundamental data of the machines are similar so that similar Fortran words, or other machine words can be used for simulations described above. The parameters such as rotation speed of the delivery roller, spinning count, number of twist, draft ratio etc. are the only variables in the computer computation. Consequently, the computer-process system for carrying out spinning operations in several separate spinning companies producing yarns of the identical type can be carried out by utilizing a common central computer system having the same function as mentioned above. In this case, it is, of course, necessary to provide the central computer-process system with functions of interruption, memory protection, address relocation, etc. In the case of applying the central computer-process system to a company having a plurality of spinning mills, the above-mentioned functions should be considered to apply.

BRIEF ILLUSTRATION OF THE DRAWINGS

FIG. 1 is a schematic plan view of a spinning mill wherein the computer-process-control system of the present invention is applied, FIG. 2 is a flow chart of the computer process-control system applied to the spinning mill shown in FIG. 1, FIG. 3 is a schematic diagram of an embodiment of an interconnecting circuit connecting a control computer and component spinning processes according to the present invention, FIGS. 4 and 5 are block diagrams showing principle of delivery-speed control in a spinning process according to the present invention, FIG. 6 is an explanatory diagram to illustrate a control system for carrying out a reserve program of semi-production product according to the present invention, FIG. 7 is a schematic plan view of a transporting system of sliver cans between the drawing process and the open-end spinning process according to the present invention, FIGS. 8A, 8B and 8C are explanatory diagrams for illustration of the control system which can be applied to the transportation of sliver cans by means of the transporting system shown in FIG. 7, respectively.

DETAILED DESCRIPTION

For the convenience of better understanding the computer process-control system according to the present invention, an automatic spinning process, comprising a continuous opening-carding drawing process, an additional drawing frame, and open-end spinning frames, utilizing the computer process-control system, is hereinafter illustrated.

Figure 1:
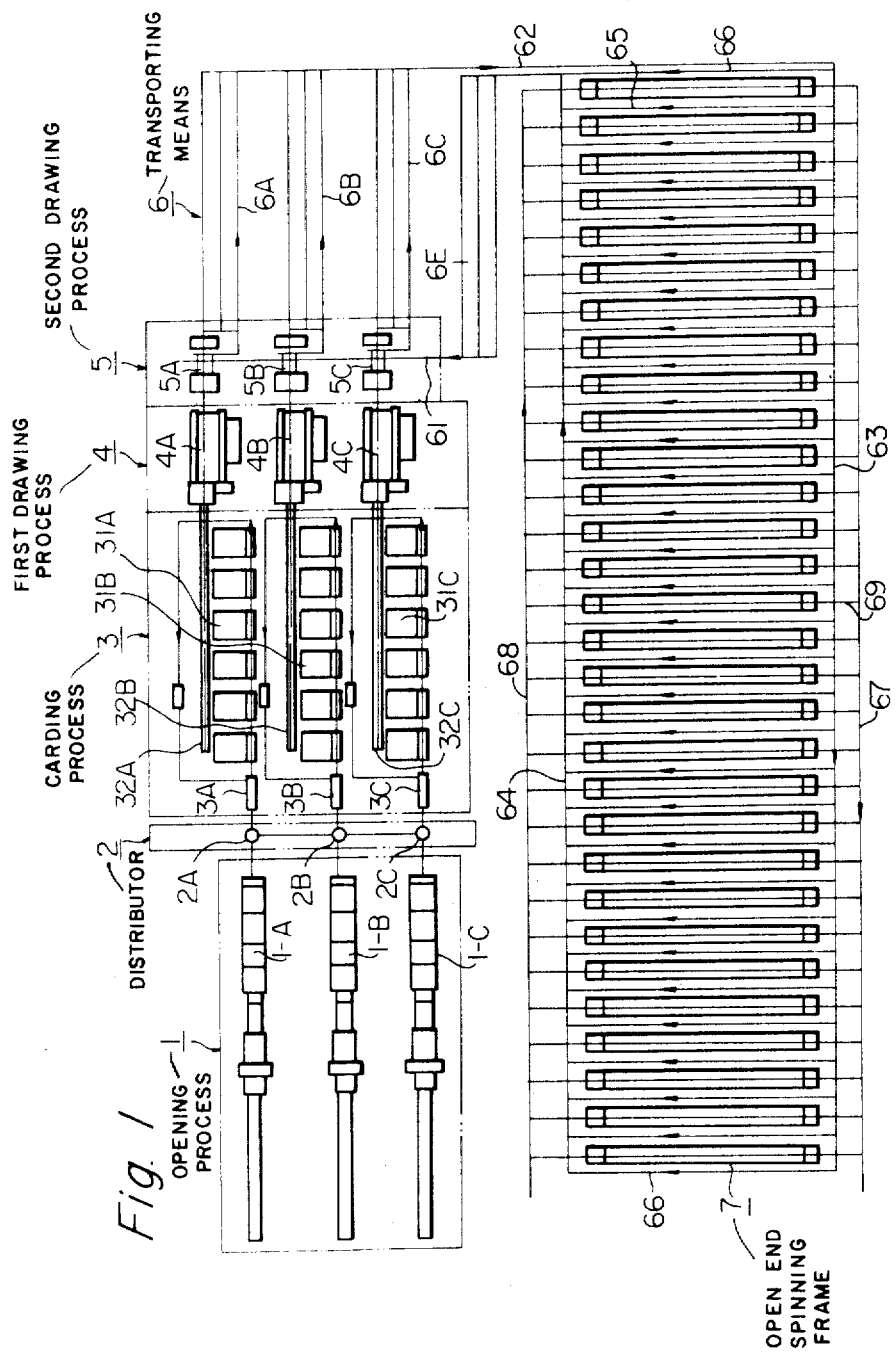

In the spinning mill shown in FIG. 1, 30 open-end spinning frames, each frame having 200 spindles, are installed, and cotton yarn, mainly 20$^S$ and 16$^S$, 30$^S$, are produced. As it can be understood from FIG. 1, the opening process 1 comprises three separate single process opening machines 1A, 1B and 1C, and these opening machines are connected to a carding process 3 comprising three groups of carding machines 31A, 31B and 31C by way of the respective reserve boxes 3A, 3B and 3C. The cotton tufts are conveyed from the opening process to the above-mentioned carding process by means of a so-called pneumatic conveying system. Each opening machine 1A, 1B or 1C can be selectively connected to one of the groups of carding machines 31A, 31B, 31C. The above-mentioned selective connection is done by means of a distributor 2 which is installed in the pipe lines between the opening process and the carding process. The pipe lines between each opening machine and each reserve box are combined by the pipe lines in the distributor 2 so as to be selectively connected by means of operating the offset mechanisms 2A, 2B and 2C. For example, the opening machine 1A can be connected to the reserve box 3A by way of the offset mechanism 2A, and can be connected to the reserve box 3B by way of the offset mechanisms 2A and 2B, and can be connected to the reserve box 3C by way of the offset mechanisms 2A, 2B and 2C. Consequently, by the selective action of these offset mechanisms 2A, 2B and 2C, the cotton tufts produced by the opening process can be selectively supplied to a particular reserve box. Each group of carding machines comprises 6 carding machines. The cotton tufts fed into each reserve box are supplied to the carding machines by means of the conventional distributor in which a circulating system is applied. The cotton tufts are conveyed in the distributor toward a direction shown by an arrow. The card slivers delivered from the carding machine are disposed upon a conveyor belt which is installed beside each group of carding machines 31A, 31B, 31C so that 6 card slivers are doubled and these doubled slivers are fed to a first drawing frame 4A or 4B or 4C, continuously. This first drawing frame forms the first drawing process 4. Therefore, the first drawing process comprises three separate drawing frames 4A, 4B and 4C. In the first drawing process 4, the drawing slivers produced by the respective drawing frames 4A, 4B and 4C are packaged in cans. These full packaged sliver cans are supplied to the respective second drawing frames 5A, 5B and 5C, of the second drawing process 5. Drawing slivers produced by the second drawing process 5 are packaged in cans. These full packaged cans are transferred to a transporting means 6. The transporting means 6 comprises full packaged cans and reserve stations 6A, 6B and 6C which connect to respective automatic cans doffing devices mounted on the respective second drawing frames 5A, 5B and 5C, and an empty-cans-reserve station 6E which connects to the above-mentioned doffing devices, a full-packaged-cans conveyor 62, which connects the full-packaged-cans reserve stations 6A, 6B, 6C to a first cans-conveyor 63 disposed along a gear-end frame of each open-end spinning frame 7, and an empty-cans conveyor 64 which is connected to the empty-cans reserve station 6E and disposed along an out-end frame of each open-end spinning frame 7, and a plurality of branch conveyors 65 which connect the first conveyor 63 and the second conveyor 64 and are disposed to an intervened space between adjacent spinning frames 7 and a branch conveyor 66 which connects the first conveyor 63 and the second conveyor 64 and is disposed along an outside of the spinning frame 7 which is installed at an end of the spinning room. A conveyor 67 for carrying full packaged products such as full packaged cheese from the spinning frames 7 and a conveyor 68 for carrying bare bobbins to the spinning frames 7 and also a plurality of connecting conveyors 69 which connect the above-mentioned conveyors 67, 68 are installed as shown in FIG. 1.

The above-mentioned equipments are shown in detail in Table 1.

TABLE 1

| Process | Designation in FIG. 1 | No. of equipment or machine | Basic data such as no. of deliveries or spindles etc. |
|---|---|---|---|
| Opening | 1 (1A,1B,1C) | 3 lines | |
| Carding | 3 (3A,3B,3C) | 3 groups | Each group ... 6 cards |
| First drawing | 4 (4A,4B,4C) | 3 | 3 deliveries Each frame ... |
| Second drawing | 5 (5A,5B,5C) | 3 | 2 deliveries Each spinning frame |
| Spinning frame | 7 | 30 | 200 spindles |
| Auxiliary equipment | 6 | | |
| Distributor | 2 (2A,2B,2C) | | |

The fundamental data of the above-mentioned machines are shown in Table 2 and 3.

TABLE 2

| Operative condition | Count of yarn | | |
|---|---|---|---|
| | $16^s$ | $20^s$ | $30^s$ |
| Rotation speed of the spinning rotor of the open-end spinning frame — rpm | 30,000 | 30,000 | 30,000 |
| Twist multiplier | 5.4 | 5.4 | 5.4 |
| Number of twist of yarn turn/inch | 21.6 | 24.15 | 29.6 |
| Standard thickness of feed-sliver, grains/6 yds | 300 | 300 | 300 |
| Standard weight of yarn grains/120 yds | 62.5 | 50.0 | 33.3 |
| Take-up speed, m/min | 35.3 | 31.6 | 25.8 |
| Production/1 drum — lb/hr | 0.1723 | 0.1232 | 0.0671 |
| Production/1 frame — lb/hr | 34.46 | 24.64 | 13.42 |
| Production/30 frame — lb/hr | 1033.8 | 739.2 | 402.6 |
| Production/1 frame — lb/day | 827.1 | 591.4 | 322.1 |
| Weight of full packaged cheese — lb | 3 | 3 | 3 |
| Standard weight of full packaged drawing cans — lb | 9 | 9 | 9 |
| Time for exhausting a full packaged can — hr | 52.23 | 73.05 | 134.12 |

TABLE 3

| Item | Drawing frame (Second) | Drawing frame (First) | Carding machine |
|---|---|---|---|
| Delivery speed of front roller, m/min | 320 | 400 | 633 |
| Standard weight of supply sliver, grain/6 yd | 475×5 | 500×6 | — |
| Standard weight of sliver produced, grain/6 yd | 300 | 475 | 500 |
| Production, lb/hr | 299.6 | 296.9 | 49.41 |
| Number of machine (delivery) | 3 (6) | 3 | 18 |
| Total production, lb/hr | 899.7 | 890.6 | 889.4 |
| Production ratio to a spinning frame % (on the basis $20^s$) | 122 | 120 | 120 |
| Weight of full packaged cans, lb/can | 9 | 45 | |
| Draft ratio | 7.92 | 6.32 | |

The other fundamental data of the spinning process, working efficiency of machines, standard waste percentage etc. are stored in the control computer.

In the above-mentioned embodiment, when a desired production schedule, for example, monthly productions of $16^s$, $20^s$ and $30^s$ yarn are decided, an optimum schedule for operating the spinning process is computed by means of the control computer. The above-mentioned simulation is carried out separately for making the optimum schedule to produce the desired monthly production of each kind of yarn. The optimum schedule may include "count changing program". The above-mentioned optimum schedule is hereinafter referred to as an initial production program or initial production schedule. After making the initial production program, the spinning operation is carried out so as to coincide the acutal production data with the initial production program. The outline of the automatic control system by the control computer according to the present invention is hereinafter illustrated with reference to the flow chart shown in FIG. 2.

(I) Automatic control of accumulative production of two successive processes by the control computer. In the flow chart of FIG. 2, the optimum schedule for producing the desired monthly production 15 of each yarn count is computed in accordance with the data which is transferred by the data communication system 14. The above-mentioned simulation 19 is done by the control computer 18 so that the initial production programs in connection with yarn counts and changing yarn counts are settled and stored. This is referred to as the initial production program storage 20. In the above-mentioned simulation, delivery speed of the semiproduction product or spinning speed of the machines is governed by fundamental data stored in the control computer 18.

To clarify the above-mentioned simulation, the following example is presented.

EXAMPLE

When the monthly yarn production schedule is decided, the initial production program is made according to the below enumerated steps. This automatic planning by the computer is hereinafter referred to as "initial simulation." Before explaining "initial simulation," it is essential to fix basic conditions for the simulation as follows.

1. Each spinning frame is used for producing one type of yarn during the monthly production schedule.
2. One spinning frame is reserved for periodic maintenance, in other words, twenty nine spinning frames are used for carrying out the monthly yarn production schedule.
3. The open-end spinning frames are operated for 24 hours/day.
4. The machines from the single process opening machine to the second drawing frame are operated for 16 hours/day by a two-shift working system.
5. The spinning operation is carried out for 26 days/month.

Assuming the monthly yarn production schedule decided by the administration department is as follows:

1. Desired amount of production
   $16^s$     80,000 Lbs
   $20^s$    120,000 Lbs
   $30^s$    at least 140,000 Lbs
2. Raw cotton for producing the above-mentioned yarns
   a. $16^s$ ........ a particular blend of several grades of raw cotton;
   b. $20^s$ and $30^s$ ...... a common blend of several grades of raw cotton.

If the above monthly yarn production schedule is decided upon, the initial simulation is carried out stepwisely by the computer as follows.

1. Computation of required number of open-end spinning frames for producing the yarns of $16^s$ and $20^s$ is carried out according to the following equation.

N = (Monthly production)/(Production capacity of spinning frame per day)

Where, N represents "Total number of spinning frames required for producing the given amount of monthly production in number of frames for 26 days."

Consequently, if $N_{16}$, $N_{20}$ represents N related to the yarn $16^s$, yarn $20^s$ respectively, $N_{16} = 80,000$ Lbs/827 (Lbs) $= 96.8$ (frames·day)

$N_{20} = 120,000$ Lbs/591 (Lbs) $= 203.04$ (frames·day)

2. Computation of the required number ($n$) of open-end spinning frames required every day for producing the yarns of $16^s$ and $20^s$ is carried out according to the following equation.

$n = N/$(working days in month) $= N/26$

Consequently, if $n_{16}$, $n_{20}$ represents $n$ related to the yarn $16^s$, yarn $20^s$ respectively, $n_{16} = 96.8/26 = 3 +$(remainder)$18.8$ $n_{20} = 203.04/26 = 7 +$(remainder)$21.04$ According to our experience of mill operation, if the remainder in the above-mentioned calculation is larger than monthly working days/2, that is, 13 in this example, we understand that it is economical to occupy one spinning frame for 1 month (26 working days). Consequently, the comparison between the above-mentioned remainder with monthly working days/2 is carried out by the computer, and the following answers are obtained. In the case of yarn $16^s$, the remainder (18.8) is larger than monthly working days/2, and therefore, one spinning frame should be occupied for all the monthly working days. In case of yarn $20^s$, the same result as the yarn $16^s$ is obtained. Consequently, the corrected number $n'$ of n with respect to the yarn $16^s$ and yarn $20^s$ are computed as follows.

$n'_{16} = 4$ $n'_{20} = 8$

Consequently, the driving speed of the open-end spinning frames for producing the yarns $16^s$ and $20^s$ can be lowered. That is, in case of the yarn $16^s$, the driving speed is lowered about 70 percent of the standard driving speed, because of the computation according to the following equation.

(Percentage of speed down of the spinning frame)

$= [1 - N_{16}/$(Occupied number of spinning frames $\times$ 26)$] \times 100$ percent $= (1 - 96.8/4 \times 26) \times 100 = 6.93 \div 7$ In the case of yarn $20^s$, the driving speed is lowered about 2 percent by the same calculation as in the case of yarn $16^s$.

3 Computation of allowable number ($n_{30}$) of open-end spinning frames every day for producing the yarn $30^s$ is carried out according to the following equation.

$n_{30} = $ (Operable number of open-end spinning frames/day)

$- (n_{16} + n_{20})$ $= 29 - (4 + 8)$ $= 17$

4 Computation of monthly production ($S_{30}$) of the yarn $30^s$ is computed according to the following equation.

$S_{30} = $ (Daily production capacity of spinning frame/frame) $\times n_{30} \times 26$ $= 322$ Lbs $\times 17 \times 26 = 142,324$ Lbs 5. Comparison of desired amount of production of yarn $30^s$ with $S_{30}$ is carried out. In this comparison, any one of the following three results is disclosed.

a. $S_{30}$ is larger than the desired amount of production of yarn $30^s$.

b. The difference between $S_{30}$ and the desired amount of production of yarn $30^s$ is negligibly small.

c. $S_{30}$ is smaller than the desired amount of production of yarn $30^s$.

In the above-mentioned two cases (a) and (b), the desired amount of production decided upon by the administration department of the company can be satisfied. However, in the case of (c), the following procedure is tried.

The above-mentioned calculations of N, n and S are repeated with particular conditions where the open-end spinning frame is operated at a higher driving speed which is within an allowable upper limit. And if the above-mentioned comparison identified by (5) discloses the conditions identified by (a) of (b), the result obtained by the repeated computation is accepted. However, if the above-mentioned comparison discloses the condition identified by (c), the computer issues a particular signal for requesting reconsideration of the administration department.

In this example, the comparison (5) falls in the condition (a). Consequently, the spinning operation can be carried out in standard condition as shown in Tables 2 and 3.

6. Required number of the second drawing frames (M) is calculated according to the following steps.

a. Required amount (P) of sliver produced by the second drawing frame/day is calculated according to the following equation.

P = (Desired amount of yarn production/Monthly working days) $\times (1 +$ loss)

Where the loss is assumed to as 0.007.

$P_{16} = (80,000/26) \times 1.007 = 3,098.5$ Lbs $P_{20} = (120,000/26) \times 1.007 = 4,647.7$ Lbs $P_{30} = (142,324/26) \times 1.007 = 5,512.3$ Lbs b. As the production capacity of the second drawing frame in 16 hours operation is calculated as (Production capacity of the second drawing frame/hr) $\times 16 = 299.6 \times 16 = 4,793.6$ if the sliver for the yarn $16^s$ is produced by occupying one drawing frame, the working efficiency (E) of this drawing frame can be calculated according to the following equation, $E_{16} = P_{16}/$(Daily production capacity of the second drawing frame) $= 3,098.5/4,793.6 = 0.646$ Now, assuming it is previously fixed that if E is less than 0.70, this drawing frame is used for producing the sliver for other yarns in the remainder time. That is, 16 hr $\times$ 0.3 = 5 hr, and the computer finds a possibility to occupy the drawing frame for the yarn $16^s$ to produce the sliver for producing other types of yarns. This is one of the characteristic features of the simulation according to the present invention.

c. As the same type of sliver is allowed to be used for producing yarns $20^s$ and $30^s$, the number of drawing frames which can be commonly occupied for producing the yarns $20^s$ and $30^s$ is calculated according to the following equation.

(Total number of drawing frames) $-$ (Occupied number of drawing frame for the yarn $16^s$)

$= 3 - 0.7 = 2.3$

The daily production capacity of the second drawing frame is 4,793.6 Lbs. Consequently, $E_{20-30} = (P_{20} + P_{30})/4,793.6 \times 2.3$ $= 10,160/11,025.28$ $= 0.92$ According to the above calculation, the daily capacity of two drawing frames is larger than that of the required daily amount of sliver required for producing the yarns 20' and 30'.

d. Consequently, the following schedule for occupation of the drawing frames is decided, No. 1 drawing frame is operated for eleven hours (= 16 hr × 0.7) to produce sliver for yarn 16' and, after 11 hours operation, the material is changed from that of 16' to 20' and 30', so as to produce sliver for yarn 20' and 30'. Then this drawing frame is operated for about 5 hours until the required number of full packaged sliver is produced, while other two drawing frames are continuously operated for producing sliver for the yarns 20' and 30'.

e According to the above-mentioned changing program in connection with the second drawing frame, the spinning process from the opening machine to the first drawing frame has to be changed. As the time required to pass the spinning material from the distributor or offset device identified by 2A, 2B, 2C in FIG. 1 to the delivery of the first drawing frame can be considered as constant T hours, the change of the offset device must be carried out not later than T hours before changing the type of sliver in the second drawing frame. Further, to prevent trouble due to mixing two different spinning materials, it is preferable to operate the cards, and the first drawing frame without treating fibers, that is, in an empty condition, for about 30 minutes. Fortunately in this example, the required time for producing sliver for the yarn 16' is 16 hr × 0.646 = 10.24 hr = 10 hr 15 min Consequently, the above-mentioned operation of the card, drawing process in free condition can be carried out for (11 hr − 10 hr 15 min) = 45 min.

7. Required number of opening machine O is calculated according to the following equation.

$O_{16} = P_{16}/$(Daily production capacity of an opening machine)
$= 3,098.5$ Lbs/$7,000$ Lbs
$= 0.44$ $O_{20 \cdot 30} = (P_{20} + P_{30})/$(Daily production capacity of an opening machine)
$= (4,647.7 + 5,512.3$ Lbs$)/7,000$ Lbs
$= 1.45$ Consequently, one opening machine can be occupied for producing the yarn 16', while two opening machines can be occupied for producing the yarns 20' and 30'.

8 Cans transporting system.

Total number of cans (c)/day for carrying out the spinning operation is calculated according to the following equation.

Figure 2:
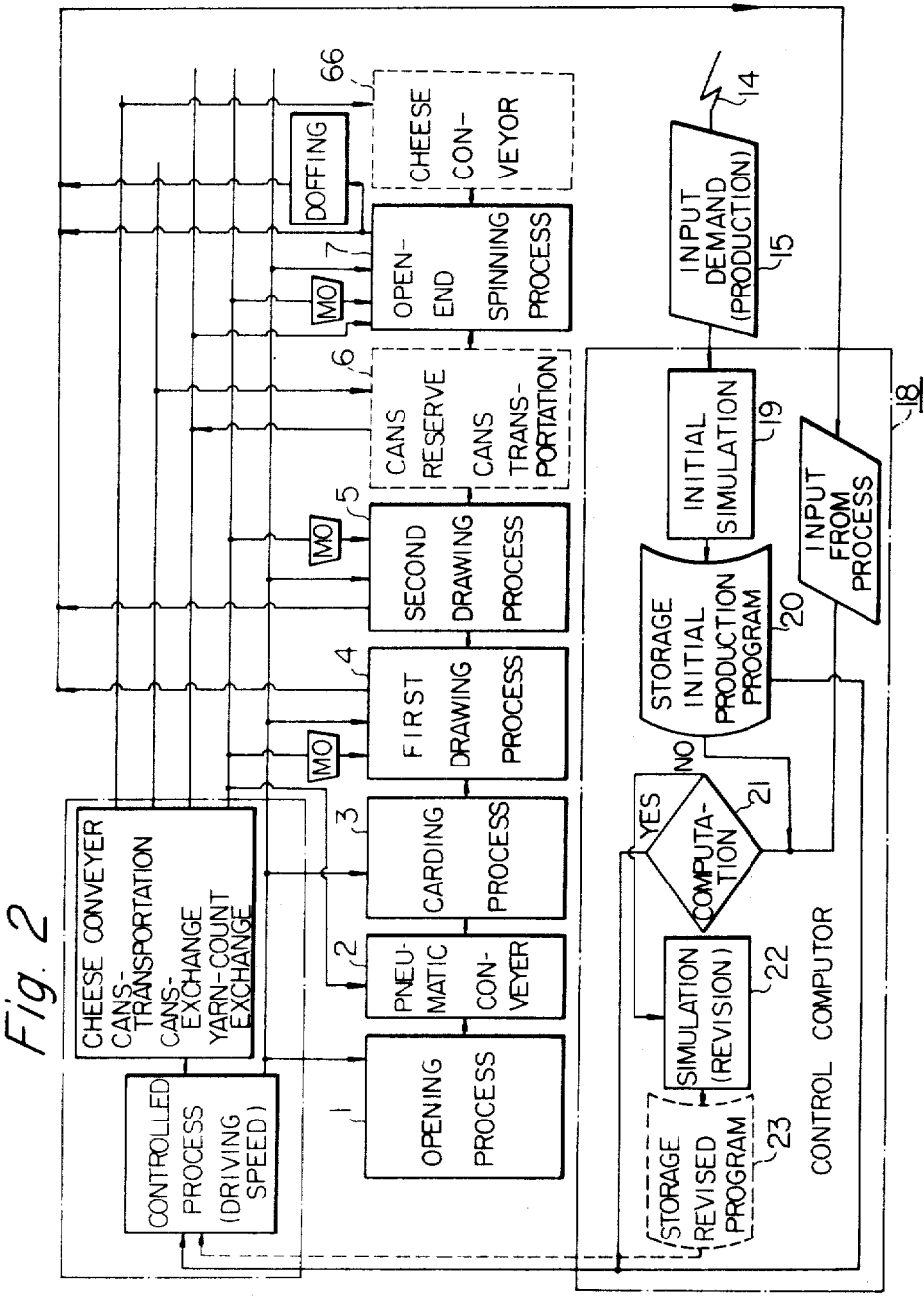

$C_{16} = P_{16}/$(Quantity of full packaged can)
$= 3,098.5/9$ Lbs
$= 344.2 \div 345$ cans $C_{20} = P_{20}/$(Quantity of full packaged can)
$= 4,647.7$ Lbs$/ 9$ Lbs
$= 516.4 \div 517$ cans $C_{30} = P_{30}/$(Quantity of full packaged can)
$= 5,512.3$ Lbs$/9$ Lbs
$= 612.5 \div 613$ cans Consequently, daily total number of cans is
$C = C_{16} + C_{20} + C_{30} = 345 + 517 + 613 = 1,475$ As hereinbefore illustrated, the embodiment shown in FIGS. 1 and 2 is provided with a can reserve position having a capacity for reserving 2,200 cans.

Consequently, the production schedule according to the above-mentioned calculations by the computer can be accepted for carrying out the automatic transportation of the full packaged cans to the spinning frame which is hereinafter illustrated in detail in pages 20, 21 and 22.

9. According to the above-mentioned calculations by the computer, the following initial spinning program is obtained as shown in Table 4.

TABLE 4

| Process | |
|---|---|
| Opening process | (1) One opening machine (No. 1) is continuously occupied for the yarn 16'. Two opening machines (No. 2, 3) are continuously occupied for the yarns 20' and 30'. <br> (2) Operative condition <br> With respect to the yarn 16', the opening machine (No. 1) is operated for carrying out the operation of the second drawing frame (No. 1) for 11 hours. <br> With respect to the yarns 20' and 30', the opening machines (No. 2, 3) are operated for carrying out operation of the second drawing frames (No. 2, No. 3) for 16 hours, and the second drawing frames (No. 1) for 5 hours. |
| Distributor or offset mechanism | The offset mechanism (No. 1) is actuated so as to change the supply connection from the opening machine to the card at the time defined by the above-mentioned change of supply source in connection with the second drawing frame (No. 1). The time of this changing is set T hours before the time of completion of producing the first drawing slivers for the yarn 16', yarns 20' and 30'. |
| Carding process and the first drawing process | (1) With respect to the yarn 16', the carding process (No. 1) and the first drawing process (No. 1) are operated for 11 hours for producing the first drawing sliver for the yarn 16', and then changed to operate for 5 hours for producing the first drawing sliver for the yarns 20' and 30'. <br> (2) With respect to the yarns 20' and 30', the carding processes (No. 2, No. 3) and the first drawing processes (No. 2, No. 3) are operated for 16 hours. <br> (3) Changing of the carding process (No. 1) and the first drawing process (No. 1) is automatically carried out by the actuation of the offset mechanism. According to the actuation of the offset mechanism, auxiliary mechanisms such as counter are automatically changed so as to conform with the type of sliver. |
| Second Drawing process | (1) With respect to the yarn 16', the second drawing process is operated for 11 hours for producing sliver for the yarn 16'. After completion of this schedule, the process is changed to produce sliver for the yarns 20', 30'. However, before this changing, to prevent mixing the first drawing sliver with the second drawing sliver, the supplied cans should be changed completely. This drawing process (No. 1) is operated for 5 hours to produce sliver for the yarns 20' and 30'. The time of the above-mentioned changing can be arbitrarily fixed, for example at 10 p.m., every day. (2) With respect to the yarns 20', 30', the second drawing processes (No. 2 and No. 3) are operated for 16 hours/day. |
| Open-end spinning Process | (1) With respect to the yarn 16', 4 open-end spinning frames are continuously occupied for producing the yarn at 7% lowered driving speed. |

| | |
|---|---|
| (2) With respect to the yarn 20°, 9 open-end spinning frames are continuously occupied for producing the yarn at 2% lowered driving speed. | |
| (3) With respect to the yarn 30°, 17 open-end spinning frames are continuously occupied for producing the yarn at standard driving speed. | |
| Transportation of the full packaged or empty cans | The transportation of the full packaged or empty cans are carried out according to the predetermined schedule as illustrated in the specification. |
| Auxiliary operations such as doffing etc. | Auxiliary operations such as doffing etc. are carried out according to the predetermined schedules as illustrated in the specification. |

During the spinning operation according to the result of the initial simulation, the accumulated productions of sliver, yarn are compared to the program fixed by the initial program. And the computer control operation is continuously carried out as described in the specification in detail.

In the actual operation of the present embodiment, the computer 18 always or periodically compares the actual production data with the initial program or compares a computed forecast production data with the initial program, e.g. when machine troubles suddenly occur a computed forecast production is compared with the initial program, and if a non-allowable result is computed, the spinning condition is regulated in accordance with command output signals from the computer 18. And if the above-mentioned non-allowable result is distinguished wherein it is computed that the above-mentioned regulation of the spinning condition is insufficient to operate the processes in the allowable condition, a revision of initial program is made so that the spinning condition is changed until the actual production data reaches the allowable range of the initial production program. This computation is hereinafter referred to as "second simulation" designated as 22 in FIG. 2. The above-mentioned revised production program is stored and this storage is designated as 23. As mentioned above, the actual production data is always or periodically compared with the initial production program (and/or revised production program). This operation is hereinafter referred to as "computation for comparison." Refeference numeral 21 in FIG. 2 represents "computation for comparison."

In the above-mentioned automatic control system by the control computer, the operation is fundamentally carried out on a basis of accumulative production in the open-end spinning frames. In the actual operation, periodical comparison is preferably carried out with respect to the accumulative production of yarn. And when the above-mentioned revision of initial program is required according to the computation, the revised production program involves revision of driving speed of whole spinning frames or of several spinning frames. And, it can be preferably arranged that the change of driving speed of any spinning frame is changed according to a predetermined changing program. This program consists of a stepwise speed change program wherein such step corresponds to new data of the computation. In this case the above-mentioned second simulation can be omitted. It is also practical to carry out short term production control, for example the production control of a day unit is carried out by the above-mentioned stepwise speed change program while the production control of a weekly or monthly unit is carried out by the first mentioned system including the second simulation.

In addition to the production control in the process of open-end spinning frames, production controls are carried out in the second drawing process 5, the first drawing process 4, the carding process 3 and the opening process 1 in the upstream orders, by utilizing the control computer 18. As already set forth in the introductory part of this specification, it is required to maintain the balanced condition between the production of the upstream process and the consumption of the downstream process for carrying out whole spinning processes in a stable condition. Consequently, once the production program of the last spinning process has been revised, it is necessary to revise the upstream processes to maintain the above-mentioned balanced condition. This is so, particularly in the case of two successive processes wherein these processes are connected by the so-called batch system. For example, for combinations of the first drawing process and second drawing process, the second drawing process and the last spinning process by the open-end spinning frames, if the driving speed of the machine in the upstream process is only regulated in accordance with the rate of regulation in the downstream process, as there is a reserve limitation of semi-production product between these two processes, it is possible to revise the initial program of each upstream processes by the second simulation so as to maintain the above-mentioned balanced condition. However, to simplify the control processing by the control computer, it is preferable to install upstream equipments having sufficient production capacity to compensate for the trouble in the downstream processes. For example, as shown in Table 3, the upstream equipments have about 20 percent excess production capacities over the production capacity of the last spinning process, so that the above-mentioned second simulation can be omitted, and the above-mentioned balanced condition between two successive processes can be maintained by changing the driving speed of each machine in accordance with the output of the control computer. However, if the driving speeds of the upstream equipments are regulated when the driving speeds of the open-end spinning frames are changed, the above-mentioned balanced condition between two successive processes is temporarily broken because there is a certain time lag due to producing packaged semiproduction products such as "full packaged sliver cans." Therefore, it is essential to stop the operation of a certain upstream-process when the reserved packages of semiproduction product exceed a predetermined limit. On the other hand, particularly in the case of changing the production rate greatly, it is better to carry out the second simulation in connection with the reserve program of the full packages of semiproduction products so as to prevent the unbalanced condition between the production of the upstream process and the consumption of the donwstream process. The above-mentioned second simulation is computed from the data of the initial reserve program, actual data of reserved packages, forecast data of reserves based upon forecast production of the upstream process and forecast consumption of the downstream process.

(II) Changing the supply route of intermediate products

When it is impossible to produce the desired amount of the product, in other words, such impossibility is estimated by the computer, it is necessary to change the initial production program. One such revision of the program is carried out by changing the supply route of the intermediate products to the downstream process, in accordance with the demand. In this case, a new simulation to find the optimum spinning program is carried out with reference to the instantaneous data showing the spinning condition of each process, data of reserved number of intermediate products, time lag which is required to complete the processing etc., additional to the stored machine words. In connection with the above-mentioned change of supply route, several manual operations, such as, draft change, changing the identification of packages etc. are carried out. These manual operations are indicated as MO in FIG. 2.

(III) Computer control system applied to the auxiliary works in the spinning process A. Transportation of cans and cheese in connection with reservation of the intermediate products As the initial production program is precisely set by the control computer, if no troubles with machines or other production parameters, etc. are encountered by the production control system, the flow of the spinning material or intermediate products in the automatic spinning process as shown in FIG. 1 is very stable in the balanced condition between the production of the upstream process and the consumption in the downstream process. However, if the supply of the intermediate products to the downstream process, the transportation of containers for intermediate products between the upstream and downstream processes are subject to troubles such as exhaustion of reserved intermediate products, interference of containers during the transportation etc., even though the above-mentioned balance between the production of the upstream process and consumption in the downstream process can be maintained, the spinning processes can not operate in a continuous and steady condition. The above-mentioned probelm is hereinafter discussed in detail. The typical case of the above-mentioned problem is the reservation of full packaged sliver cans of the second drawing process and their transportation to the cans exchanging positions before the open-end spinning frames. Generally speaking, if sufficiently large space for reserving the full packaged sliver cans can be found between the drawing frames and the open-end spinning frames, there is no problem to be discussed. However, there is a certain limitation of reservation space. From our experience, it is required to reserve full packaged sliver cans of one-half to one-third of the total number of spindles or drums of the open-end spinning process for carrying out continuous and steady operation. According to the simulation, it is found that it is sufficient to reserve one-third of the total number of spindles or drums for carrying out the spinning operation at very high working efficiency. One reason why the number of reserved cans can be reduced is due to the fact that the above-mentioned conveyor transportation itself offers a space which can be utilized for reservation. That is, in the reserving and transportation program of the full packaged sliver cans according to the present invention, the full packaged sliver cans are reserved in accordance with the predetermined schedule under the balanced condition between the production in the second drawing process and the consumption in the open-end spinning process, and transferred to the open-end spinning room by a series of conveyors in accordance with the transferring program. As already mentioned, 2,000 full packaged sliver cans, or 2,200 cans are sufficient to carry out the operation continuously. These cans are reserved in reserve stations 6A, 6B and 6C in 31 rows of can exchanging positions before the open-end spinning frames 7, and the empty cans can be stored in the empty cans reserve station. In the present embodiment, as the number of spindles of an open-end spinning frame 7 is 200 drums, 50 or 100 cans are exchanged at one time. Consequently, if 50 cans are reserved at the cans-exchanging station before the open-end spinning frame as a group, 50 × 30 (rows) = 1,500 cans can be reserved at whole cans-exchanging stations. Therefore, 2,000 − 1,500 = 500 cans must be reserved in the can reserve stations 6A, 6B, 6C and 6E. If, the capacity of the full packaged cans of the second drawing process 5 is several times the full packaged quantity of the cheese produced in the open-end spinning process, the programing of the cans transportation can be simplified. For example, in the case where the full package weight of the above-mentioned cheese is 3 lbs while the capacity of the full packaged sliver cans of the second drawing process 5 is 9 lbs, the sliver cans positioned before the open-end spinning frame are exhausted at every three doffing operations, consequently, a very systematic program for carrying out the doffing operation, yarn piecing operation in connection with the doffing operation, supply of the full packaged sliver cans, discharging the empty cans from the spinning frames can be made by the control computer. In the above-mentioned transportation, the most effective function of the computer control system according to the present invention is the computer control for preventing mutual interference of cans trains during the transportation. As there is a limitation to the installation of the number of conveyors in the open-end spinning room, if the order of supply to the spinning frames is not controlled, it is impossible to avoid interference between one cans train and another train during the transportation. Therefore, in the computer control system according to the present invention, the supply order of the full packaged cans is computed in accordance with the output pulse signal from the open-end spinning frame which indicates the demand for supply so as to prevent the above-mentioned interference. The above-mentioned function of the computer control system will be hereinafter illustrated in detail.

As shown in the flow chart of FIG. 2, a pulse signal which represents the actual production rate is an input to the control computer, and the accumulative production is computed. And the above-mentioned accumulative production is compared with the program. If the computer detects that the calculated data is within the allowable range, the production is continued in the same spinning condition, but, if the computer detects that the calculated data falls outside of the allowable range, the driving speed of the second drawing frame is adjusted as already illustrated. The detailed examples of adjusting the driving speed of the machine will be hereinafter illustrated. In the drawing process 4, 5, the number of full packaged sliver cans is computed by the control computer 18 in accordance with the above-mentioned pulse signal fed into the computer 18. Or, a pulse generator for generating a pulse at each time of a cans-exchanging operation can be preferably applied to the drawing frames. In this case, the above-mentioned computation by the control computer can be omitted.

Each spinning frame is provided with a pulse generator for indicating the timing of doffing. Therefore, when the indication signal is fed to the control computer, the order of the automatic doffing operation in connection with the spinning frame is computed so as to avoid the interference of doffing operation between the spinning frames. This interference can be prevented by the same manner as that for preventing the interference of cans-trains during transportation which will be illustrated the last portion of this specification. With respect to the cheese conveyor, the full packaged cheese can be conveyed by a conventional conveyor, therefore the control computer 18 is only used for calculating the total number of products in connection with each spinning count or varieties of products, and the sum up data can be fed to the central computer system by means of on-line communication system.

B. Cans-exchange operation

In cans-exchange operation of the drawing frame, since both the first and second drawing frames adopt a so-called self-control type automatic means, in which an exchange apparatus is operated through pulse signals generated by a counting or recording means for recording production (e.g. the above-mentioned pulse generator) which cooperate with a pair of callender rollers or delivery rollers, the cans-exchange operation of the drawing frame does not need to be controlled by the computer. However, as the second drawing process applies an automatic conveying means for transferring full packaged sliver cans to the open-end spinning frames, the selection of the spinning frames to which full packaged cans are carried without any difficulty of transportation is preferably carried out by the control action according to an output of the computer.

C. Automatic yarn piecing machine

When piecing operation is carried out by using the automatic yarn piecing machine at the stage of doffing of a full packaged cheese, this automatic piecing machine is positioned according to the doffing program. In case of a semi manually doffing operation, the spinning frame which is required to carry out the doffing operation, is indicated by buzzers or pilot lamps. Supervision of the yarn breakage and the yarn piecing operation when the yarn break is detected, may be carried out by travelling the automatic yarn piecing apparatus along the spinning frame, according to an optional program which has been set separately.

Next, actual operations of program control for adjusting the spinning speed, reserving amount of intermediate products and also, transferring full packaged cans to the spinning frame will be explained more in detail in the examples.

A. Adjusting of the spinning speed

As already explained, an actual accumulative production of each spinning frame can be mounted and read through the pulse signals emitted from a counter roller directly related to take-up rollers of the open-end spinning frame or the rotating motion of the front rollers.

Figure 3:
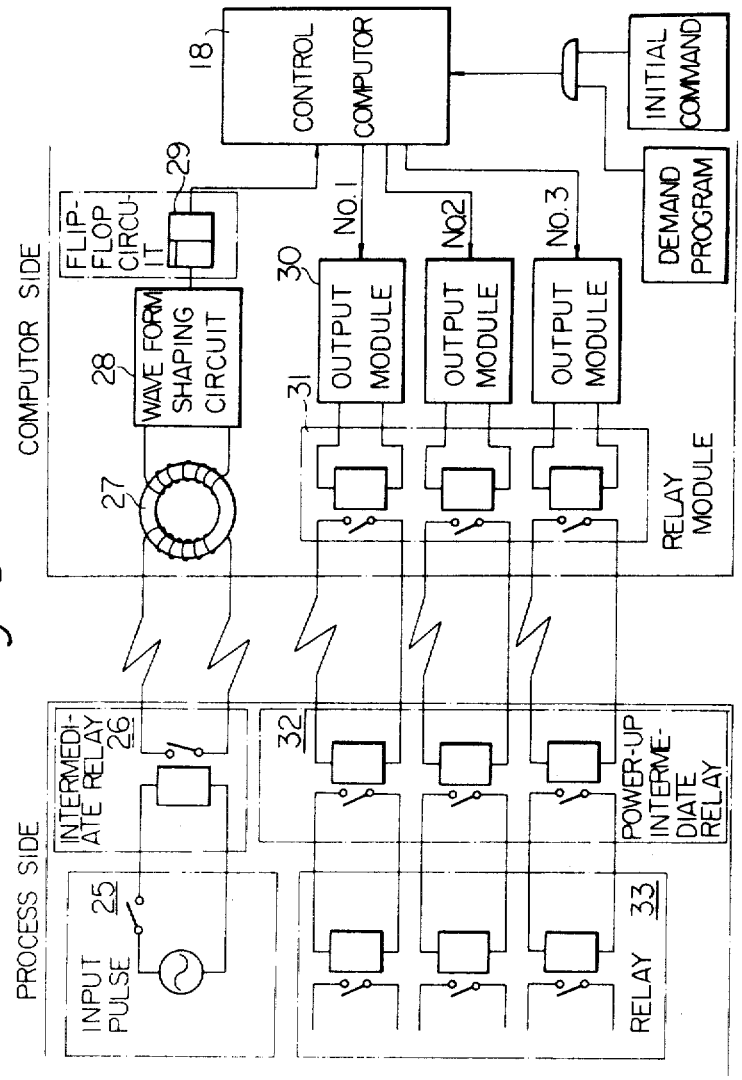

FIG. 3 schematically shows a conventional interconnecting circuit system in which pulse input signals 25, which are emitted from the above-mentioned pulse signal generator, are imparted to the control computer 18 through intermediate relay 26 for driving the flip-flop, transformer 27, wave form shaping circuit 28 and flip-flop circuit 29.

In this computer, the initial production schedule is compared with the accumulated pulse numbers corresponding to the production schedule. If the result is within the allowable limit, signals are not generated at all. When the result exceeds the upper limit, the output circuit of No. 1 is selected, however when the result is below the lower limit, the output circuit of No. 2 is selected. In both the No. 1 and No. 2 output circuits, a number of pulse signals which correspond to the amount of the deviations, are emitted from output end 33 through output module 30, relay module 31, and intermediate relay for power increase 32. By means of these output signals, the spinning speed can be controlled by the control system, for example, as shown in FIGS. 4 and 5.

Figure 4:
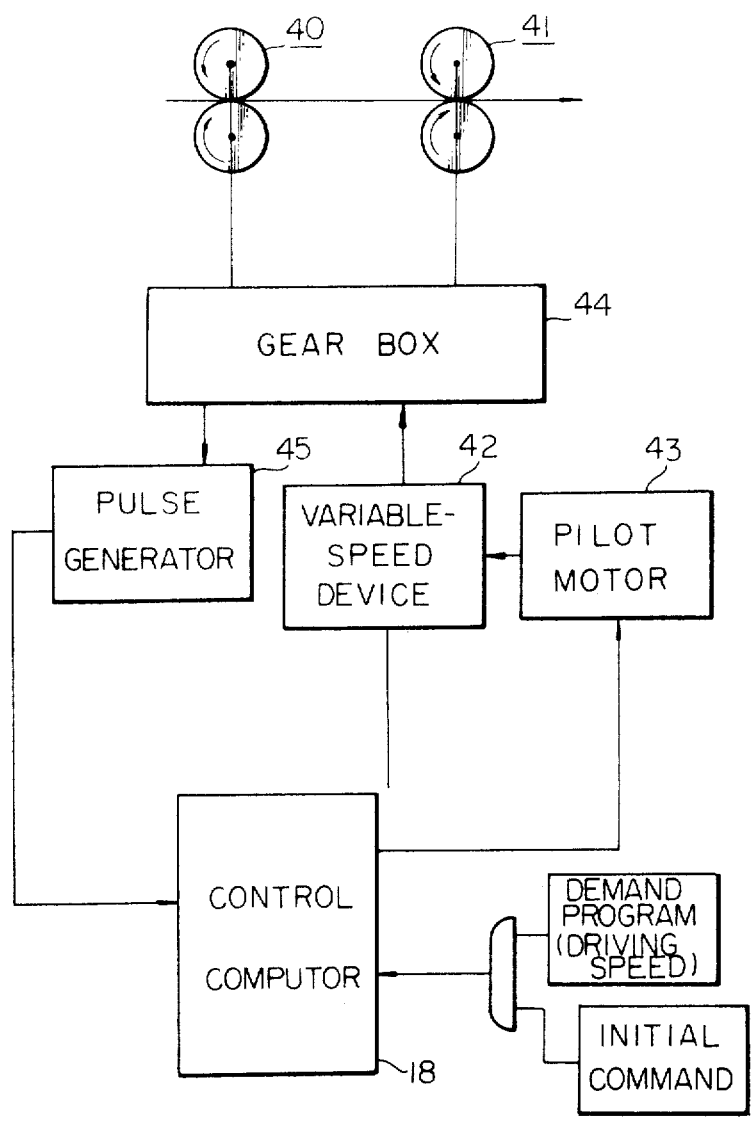
Figure 5:
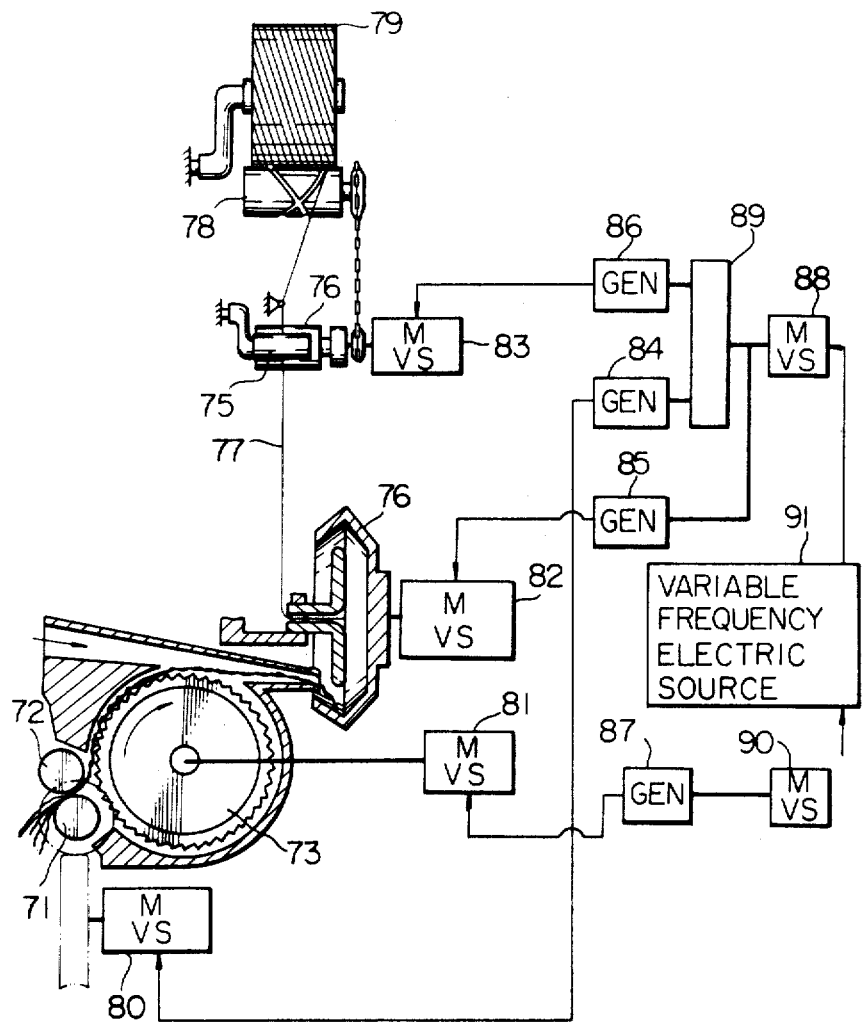

FIG. 4 shows a system in which a variable speed mechanism such as a vari pitch sheeve is generally arranged between the power unit of the spinning machine and the driving mechanism of the spinning machine, and this system can be applied for the operations prior to that of the drawing frame in the spinning processes shown in FIG. 1.

For example, in FIG. 4, paired rollers 40, 41 are driven by the power unit such as a constant speed motor (not shown) through variable speed gear 42 and gear box 44. The variable ratio of this variable speed gear 42 is adjusted by pilot motor 43. Also, pulse signal generator 45 which emits a pulse for every constant rotation of the front roller, is provied for gear box 44. This pulse signal generator 35 is designed in such a manner that its emitting pulses correspond to input signal 25 shown in FIG. 3.

The pilot motor 43 is a pulse motor which rotates in a forward or reverse rotating direction by predetermined angles in response to the output signals, for example the number of output pulse, of the computer, that is to say, of the interconnecting circuit system shown in FIG. 3.

The rotating direction is determined through the automatic selection of the output circuit No. 1 or No. 2.

In the actual driving operation, a desired production value (a program value) in accordance with a predetermined program, is imparted and stored into the computer by an initial command, and then the automatic adjustment for the driving speed is carried out by the above-mentioned comparison with respect to this stored production program. It is understood that this system of the driving operation corresponds to a feed back control in an automatic control system.

Also, when the result of the above-mentioned comparing operation deviates from the allowable limit of the production program, the prediction is carried out as is previously described, and the corrective program is calculated.

Then, the measured driving speed (pulses), in accordance with this corrective program, is compared with a set speed for spinning operation in accordance with the desired program, so that adjustment of the driving speed can be carried out throuh the above-mentioned automatic selection of the output circuit No. 1 or No. 2. In this system, variation of spinning speed with respect to the lapse of time is minimized, so that stable operation can be achieved and the products of uniform quality, are obtained.

Also, if the variable speed gear is set at a plurality of steps of speed, for example, at three steps of high speed, standard speed and low speed and if a change-over clutch is provided instead of pilot motor 43, it is possible to change the spinning speed to the high speed or the low speed by pulse signal through the above-mentioned automatic selection of the otput circuit No. 1 or No. 2 of the computer.

According to this method, there is the advantage that the structures of the computer and the variable speed mechanism can be extremely simplified. However on the other hand, the bad effect due to the sudden change of the spinning speed at the time of changing over operation can not be avoided.

Referring to FIG. 5, another adjusting system of the driving speed is shown in which a variable frequency electric power source is applied for driving of the open-end spinning frame. This kind of driving system is disclosed in detail in the specification; Title of the invention: A method and apparatus for driving of open-end spinning frame, U.S. Patent Application Ser. No. 134,726, filed Apr. 16, 1971, which is applied by the applicant, and its summary is as follows.

Motor 88, a pair of feed rollers 71, 72 for supplying a bundle of fibers; a combing roller 73, which is considered as a mechanism for liberating the bundle of fibers into separated fibers. A spinning rotor 74, which corresponds to a twisting mechanism. A pair of draw-off rollers 75, 76 for delivering a yarn 77 from the rotor 74, and a take-up roller 78, which is a winding mechanism, are capable of being driven by individual motors 80, 81, 82, 83, respectively and these motors, except 81, are connected to generators 84, 85, 86, respectively, while the motor 81 is connected to a generator 87 which is driven by a variable speed electric motor 90. These generators 84, 85 and 86 are driven by the variable speed electric motor 88. That is, the motor 88 directly drives a shaft of the generator 85 which is a high frequency electric source of the motor 82 for driving the spinning rotor 74 at very high speed. The motor 88 also drives a gear box 89 for driving shafts of the generators 84, 86 at the respective reduced speeds so as to apply the corresponding electric powers to the motors 80 and 83, respectively. The other variable speed motor 90 drives a shaft of the generator 87 directly so that the motor 81 for the combing roller 73 is driven at a speed corresponding to the output generated by the generator 87. The production rate per unit time is determined by the take-up speed of yarn 77 from the spinning rotor 74 and the required number of twists to be imparted upon the yarn 77 is defined by the number of revolutions of the rotor 74 per a unit time and the take-up speed of yarn 77 from the rotor 74, consequently, a pulse generator 92, which generates a constant pulse in accordance with the number of rotations of the take-up roller 76, is mounted on the gear box 89, the above-mentioned pulse is used as an input signal 25 of the interconnecting circuit shown in FIG. 3. Then, the frequency of the output of the variable frequency source 91 is adjusted conventionally in accordance with the command signal output from the control computer 18. Therefore, the driving speed of the variable speed motor 88 is adjusted in accordance with the regulation of the frequency of the output from the variable frequency source 91 so that the driving speed of the open-end spinning frame can be adjusted.

B. Method for controlling the reserved number of intermediate products

Figure 6:
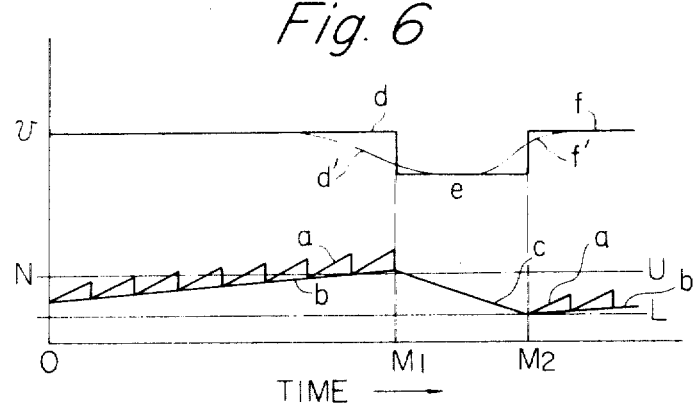

As already illustrated in the previous portion of this specification, it is required to control the reserved number of intermediate products such as full packaged sliver cans of second drawing process so as to always maintain them within an allowable range. To clarify this method according to the present invention, an example in connection with the sliver cans of second drawing process 5 is hereinafter illustrated. In the embodiment shown in FIG. 1, the production capacity in the upstream processes exceeds by about 20 percent over that of the open-end spinning process. Now, the production number of full packaged sliver cans is counted by a pulse counter mounted on the second drawing frame 5 and the pulse signal is fed to the control computer 18. Further, the number of full packaged sliver cans delivered from the reserving stations 6A, 6B and 6C is counted by a pulse generator (not shown) disposed at outlets of the reserving stations 6A, 6B and 6C. The counted signal is fed into the control computer so that the number of full packaged sliver cans in the reserving stations can be always computed by the computer 18. Referring to FIG. 6, wherein, the number of reserved sliver cans is represented by N, and the driving speed of the first drawing frame is represented by V, the number (N) of full packaged cans reserved in the reserving stations increases despite the supply to the open-end spinning frames in the case where the production capacity of the second drawing process is slightly larger than the consumption capacity of the spinning process. As already illustrated, a group of full packaged cans, for example 50 full packaged cans as a group are transported to an exchanging station before an open-end spinning frame 7 to which is commanded the supply of new full packaged cans according to the command signal of the control computer 18. Therefore, the number (N) of the reserved cans in these stations 6A, 6B and 6C is stepwisely decreased but as against this, increased gradually in accordance with the production of the full packaged sliver cans in the second drawing process 5. Therefore, the variation of the number (N) of full packaged cans can be represented by a saw tooth like curve "a" in FIG. 6. While a straight line b represents the gradual increase of number of reserved cans in the stations 6A, 6B and 6C. As is already mentioned, there is a certain upper limit to the number of the cans reservation. On the other hand, there is a certain lower limit to the number of the cans reservation so as to ensure a stable spinning operation. Now, in this illustration, the upper limit is designated by U and the lower limit by L. Through the use of the computer, it is possible to automatically estimate the moment at which the actual number of cans reservation exceeds the level U. On the basis of such estimation, command signals for lowering the driving speed of the first drawing frames and the carding machines are emitted from the control computer 18 at a selected moment preceding the above-estimated moment of the excess so as to lower the above-mentioned speeds. In FIG. 6, such preceding lowering of the speed is designated by a line $d'$. When the computed number of reserved cans reaches the upper limit "U" at the moment $M_1$, the second drawing frames are stopped in accordance with the command signal from the control computer 18. If means for detecting the actual reservation corresponding to the upper limit "U" is disposed at the stations 6A, 6B and 6C, the above-mentioned command signal for stopping the second drawing frames can be omitted. At this stage of the operation, lowering of the speed of the first drawing frames and the carding machines still goes on. When the computed number of reserved cans reaches the limit "L", the second drawing frames are restarted by the command signal from the computer 18. In the above-mentioned illustration, a plurality of first drawing frames and second drawing frames are operating to produce the same intermediate product.

There must be established a balanced relationship of the production and the consumption of the sliver between the first drawing frames and the second drawing frames. A small space is provided in between the two processes for the reservation of the sliver cans. However, because the size of such space is very limited, the first drawing frames must be stopped following the stopping of the second drawing frames and this naturally results in the stopping of the carding machines connected thereto. It is common knowledge that stopping of the carding machine tends to cause the breakage of the web and/or the possible introduction of impurities such as lints. From this point of view, in the case of the present example, the stopping of the second drawing frames is foreseen by the function of the computer and the lowering in the speed of the first drawing frames and the carding machines precedes the actual moment of the above-estimated moment of the stop. After this lowering in the speed there is a speeding up of this frame while the second drawing frames still maintain their stopped condition and, at a moment appreciably later than the restart of the second drawing machine, the initial speeds are revived. This control of the speed change is carried out according to the command signals for such effect from the computer. The above-mentioned computation by the computer can be carried out with an extremely enhanced precision by utilizing the balanced relationship between the production and exhaustion of the slivers by the first and the second drawing frames and the accessible number of reservation between the two processes. Further, in FIG. 6, the curve C represents the change in the reserve of the full packaged cans of the second drawing frames on the reserve station whereas the curves "e" and "f" represent the mode of acceleration of the speeds of the carding machine and the first drawing frames upon stopping and restarting of the second drawing frames, at the moments $M_1$ and $M_2$. The driving speeds are all designated by "v" for easy illustration in the drawing. This may be understood to show the acceleration and deceleration of the normal running speed (however, the second drawing frames stop during the period "e"). According to the result of the mill experiment, it is confirmed that no trouble will happen regarding the quality of the sliver even when the extent of the speed drop is in a range from 10 to 20 percent of the normal running speed.

In the above-mentioned example, the second drawing frames are driven at a constant speed and are stopped and restarted by the command signal from the computer 18. Therefore the driving condition of the second drawing frames is represented by the diagram d-e-t.

As is above-described, in the spinning process including a plurality of continuous processes connected with each other via intervening reservation station of the intermediate products, the system of the present invention is characterized by the features that the basic data for production and the processing conditions including the reservation program are stored initially in the computer, the actual production conditions are inputs to the computer at selected moments, computation, in connection with the reservation of the intermediate products which is required for a constant connection of the both processes from a microscopic point of view, is carried out by the control computer, the production is continued without any change of the initial program when the estimated result is within the range of the allowable limits in accordance with the reservation program, one of the variable parameters of the above-mentioned process conditions is adjusted when the estimated result falls outside the allowable limits, the program is revised to as to make the estimated result fall within the allowable limits for the control of the production condition of the manufacturing machine, and the above-mentioned computer control is repeated at necessary moments; thereby the production and the consumption of the successive two processes can be carried out according to the designed program very stably and precisely, that is, the control of the production of the above-described spinning system is automatically carried out with the assurance of an extremely high precision.

C. Programing of the transportation of the full packaged sliver cans to the spinning process and programing of the transportation of the empty cans to the second drawing process, and practice of these programs.

The full packaged sliver cans are supplied to the spinning process according to the transportation method already explained in detail. In the practice of this operation, the possible mutual interference between the groups of cans during the transportation can be obviated easily through an employment of the computer control technique. This controlling system will be explained in more detail later on. For convenience in the explanation, a detailed explanation will now be made of the transportation system shown in FIG. 7.

Figure 7:
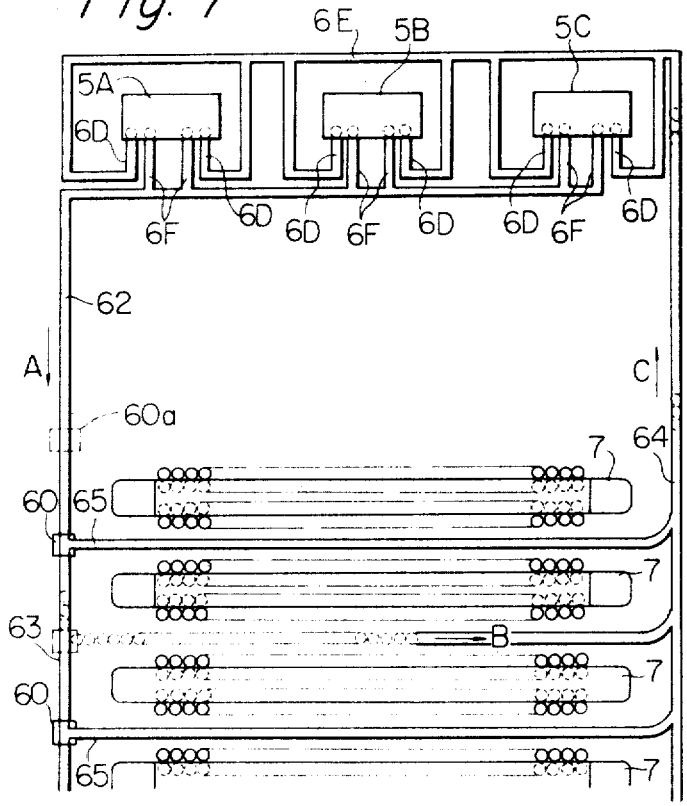

In the embodiment shown in FIG. 7, the second drawing process 5 is connected with the spinning process, wherein 30 open-end spinning frames 7 are installed, by the first transportation conveyor 62 and 63 for carrying the full packaged sliver cans and the transportation conveyor 64 for the empty cans. The drawing process 5 functions as a supply source of the full packaged sliver cans in a balanced condition regarding the production capacity. Both the transportation belts 63 and 64 are connected with each other by the branch conveyor 65. On the respective drawing frames 5A, 5B and 5C, the full packaged sliver cans are one by one discharged from the respective discharge path 6F and, thereafter, are transported towards the spinning room by the transportation conveyors 62 and 63 as shown by the arrow A in the drawing. The group of the drawing frames 5A, 5B and 5C and the spinning frames 7 are balanced with each other with regard to their production capacities. When the auto-counter of the spinning frames 7 counts the consumption of prescribed amount of the sliver and generates a signal (pulse) indicating the foreseen exhaustion of the sliver in the sliver supply cans, a plurality of, say 50, full packaged sliver cans are transferred from the reserving stations 6A, 6B or 6C to the transportation belts 62. In the present embodiment, sliver cans are arranged in front of the spinning frame in double alignments and the difference in the amount of sliver remaining in the cans in the forward alignment and in the rearward alignment is always made to correspond to the difference in the capacities of the full and half full cans. As mentioned above, the autocounter generates signals prior to the complete exhaustion of the slivers in the cans in the forward alignment and, concurrently, emits the pulse signal for inviting the full cans and this pulse signal is fed to the control computer 18. At this moment, the amount of the slivers in the cans in the rearward alignment becomes half of the full amount.

Upon emission of the above-mentioned pulse signal for inviting the full cans, the branch conveyor 65 is driven in the direction shown by the arrow B and a taker-in device 60 functions so as to invite the full packaged sliver cans onto the branch conveyor 65, the taker-in device 60 being positioned at the crossing of the branch conveyor 65 with the transportation conveyor 63. When the prescribed number of full packaged sliver cans are arranged on the branch conveyor 65 along the spinning frame 7, the branch conveyor 65 ceases its travel and the operator starts the exchange of the can from a selected termination side of the spinning frame 7.

In this manual exchange operation, the can in the rearward alignment is first taken out, and placed on the branch conveyor 65 and this can is replaced by a can from the forward alignment. Finally, the can originally placed on the branch conveyor 65 are removed therefrom and placed in the position of the can in the forward alignment. Naturally, the leading ends of the slivers in the full cans must be pieced with the trailing ends of the slivers in the taken-out cans during the above-mentioned cans exchange operation.

By repeating the above-described operation from one to another termination of the spinning frame 7 in the direction shown by the arrow B, the half full cans are placed in the forward alignment, the full cans are placed in the rearward alignment and empty cans are placed on the branch conveyor 65.

After completion of the cans exchange operation, the branch conveyor 65 starts its travel for the transportation of the empty cans in the direction shown by the arrow B and thusly transported empty cans are then transferred onto the second transportation conveyor 64 so as to be advanced towards the second drawing process 5. The second transportation conveyor 64 is connected to the inlet path 6D of the respective drawing frames 5A, 5B and 5C so as to introduce the above-described empty cans one by one.

When the number of the spinning frames exceeds the transportation capacity of the above-described transportation system, there tends to result a mutual interference in the transportation system. That is, provided that the initial program of the cans supply (group supply) is carried out one by one along the order of the spinning machines layout, it is usual that the actual supply of the cans deviates from the initial program. Therefore, the order of the cans supply to the spinning frames does not always coincide with the order of the spinning machines layout along the travelling direction of the first transportation conveyor 63 from the cans inlet side. Such disorder of the cans transportation is caused by the change in the time-interval of supply to the respective machines due to the variation in the production capacity, and due to the changes of yarn count. So, it is impossible to obviate the occurrence of the above-mentioned mutual interference in the transportation system when the system is accompanied by only one set of transportation conveyors 63 when the number of spinning frames exceeds the capacity of the transportation system. Once the interference takes place, the smooth transportation of the cans is affected and, in an extreme case, the running of the spinning frames must be discontinued. However, by employing the computer control system of the present invention, the above-mentioned undesirable interference in the transportation system can be successfully obviated.

According to the present invention wherein the interference of the full packaged cans on the transportation conveyor 63 is obviated through employment of the computer system, a standard ordering of the full packaged sliver cans on the inlet terminal 60a of the transportation conveyor 63 is first settled, i.e., the ordering of the cans in the condition of no interference is settled first. On the basis of this setting, the function of the taker-in mechanism 60 disposed on the transportation conveyor 63 is controlled. In the case of the shown embodiment, a certain length of time is needed for transporting the group of the full packaged sliver cans as it approaches the other termination of the conveyor 63 from the inlet terminal thereof because only one set of transportation conveyor 63 is diposed therein.

Provided that the transportation conveyor 63 is driven at a constant traveling speed (In this case, it is necessary to provide appropriate means for transferring the full cans to a suitable reserve position when some of the full packaged sliver cans have not been supplied to the spinning frame and remain on the conveyor. For example, the conveyor 63 is structured in a loop shape and is connected to the reserve stations.) the length of time needed for transporting the full packaged sliver cans from the above-mentioned inlet to the taker-in device is given in the form of "$nt$" wherein "$t$" is the length of time needed for transporting them from a taker-in device to the neighbouring taker-in device, e.g. from a spinning frame to the neighbouring spinning frame, and "$n$" is the decimal address number of the spinning frame located on the terminal opposite to the inlet side. On the other hand, auto-counters of pulse emitting types are mounted on the spinning frames so as to emit pulse signals when the amount of the slivers in the cans reaches a prescribed limit (one-half in the foregoing example). In the actual process, this pulse emission takes place prior to the above-mentioned time necessary for the transportation of the cans, exchange of the cans and piecing of the slivers.

Figure 8A:
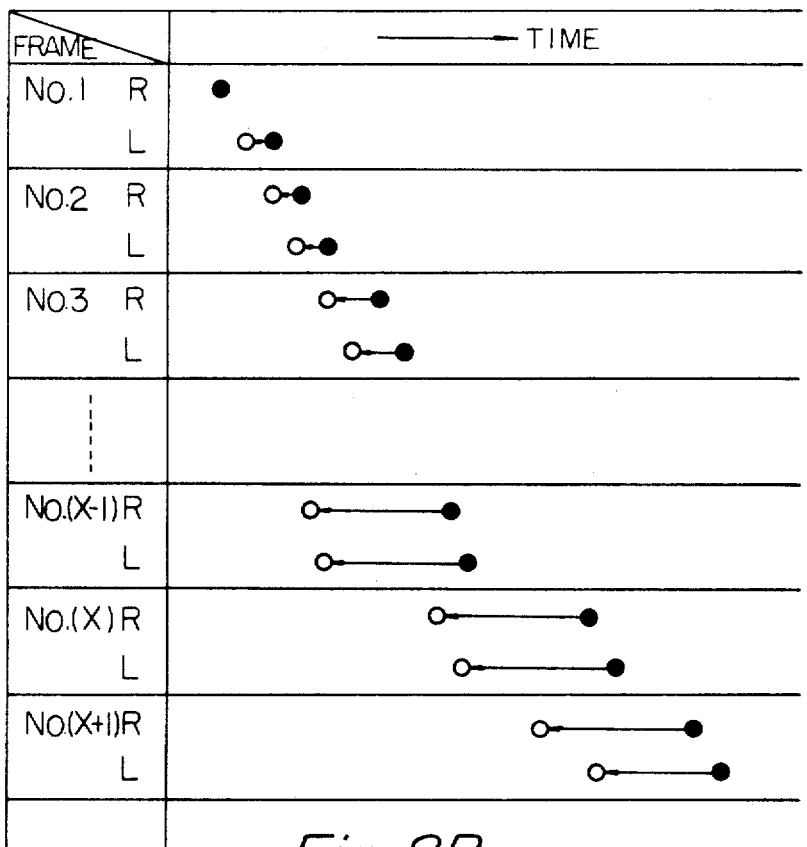
Figure 8B:
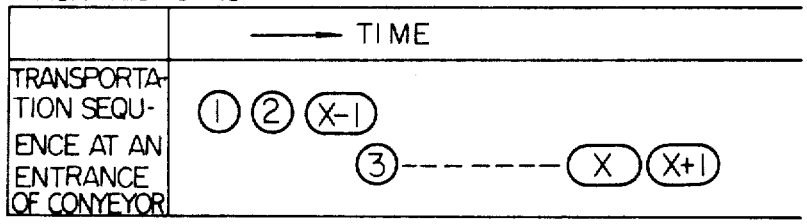

The diagram of the pulse thus emitted is illustrated in FIG. 8A, wherein the black circles designate the moments of the pulse emission. Upon input of the pulse into the computer, computations are performed regarding the value of "$nt$" and the moment which precedes the moment of the pulse emission by time "$nt$". This computed moment is marked by the blank circle in the illustration. By knowing the time-series of the blank circles thus obtained, the sequence of the full packaged sliver cans transportation is set as shown in FIG. 8B. Once the above-mentioned sequence of the transportation is set, the computer governs the function of the taker-in devices following thusly set ordering as shown in FIG. 8C, thereby the passing of the full packaged sliver cans (in the foregoing example, 50 cans form a group) is permitted according to the traveling speed of the transportation conveyor or the full packaged sliver cans are introduced into the corresponding spinning frame. Supposing that the circuit No. 3 in FIG. 3 is used for this purpose, the actuator of the taker-in device is so designed that absence of the command signal from the computer permits free passing of the cans whereas presence thereof introduces the cans onto the branch conveyor 65 in front of the spinning frame. Then, the actual transportation order of the full packaged sliver cans does not always correspond to the order of the pulse emitted from the spinning frame but to the ordering corrected by the computer as shown in FIG. 8B. However, if the actual order of the cans to be supplied to the spinning frame follow the order of the pulses emitted from the spinning machine as shown in FIG. 8A, no interference takes place on the transportation conveyor 63 and the full packaged sliver cans can be supplied to the spinning frame in good order. In the case of the return of the empty cans in the foregoing example shown in FIG. 7, it is not absolutely necessary to employ the computer system. So as to smooth the operation, it is desirable to dispose an adequate stand-by means at crossings of the conveyor 65 and 64.

When several kinds of full packaged sliver cans of different spinning counts are to be supplied to the several types of spinning groups, distinction of the spinning counts can be performed even without use of the computer.

In this case, a suitable attachment is attached to the cans. For example, the cans are provided with bottom flanges of different types and the purposed distinction of the cans can be carried out in a manner similar to that conventionally employed in the conveyor system. Further, a smooth practice of the cans supply can be carried out even without by using the above-described computer system for elimination of possible interference in the following manner. In this case, the transportation conveyor 63 itself is structured circularly and multiple groups of cans are circulated at random being mounted on the conveyor 63. Upon a direct actuation of the taker-in device 60 by the invitation signal emitted from the spinning frame, the supply of the full packaged sliver cans is effected. The absence of the cans caused by this supply is compensated by the supply of the full packaged sliver cans from the cans reserving conveyor. However, it should be realized that, in the case where this system is employed, there remain the problems of the floor space necessary for the installation of the cans reserving conveyor and of the limit of the number of the spinning frames applicable to the system.

What is claimed is:

1. A variable speed system for actuating a drawing frame in an automatic spinning operation, comprising:

a a pair of paired rollers;
   b a variable speed gear connected to said pair of rollers through a gear box;
   c pilot motor means connected to said variable speed gear, said pilot motor means being rotatable through a predetermined angle responsive to a predetermined number of output pulses applied thereto from a control computer for adjusting the variable ratio of said variable speed gear; and,
   d a pulse signal generator connected to said gear box for providing a pulse to said control computer for every rotation of said paired rollers.

2. The variable speed system as recited in claim 1 where said pilot motor means rotational direction is determined by said predetermined number of output pulses from said control computer.

* * * * *